United States Patent
Yaegashi et al.

(10) Patent No.: US 6,280,339 B1
(45) Date of Patent: Aug. 28, 2001

(54) DRIVING SHAFT WITH MALE AND FEMALE SHAFT MEMBERS

(75) Inventors: Toshihiko Yaegashi; Atsushi Oikawa; Yuichi Nakamichi, all of Tokyo (JP)

(73) Assignee: Matsui Universal Joint Corporation (JP)

( * ) Notice: Subject to any disclaimer, the term of this patent is extended or adjusted under 35 U.S.C. 154(b) by 0 days.

(21) Appl. No.: 09/393,605

(22) Filed: Sep. 10, 1999

(30) Foreign Application Priority Data

Feb. 23, 1999 (JP) ................................................ 11-044775
Feb. 23, 1999 (JP) ................................................ 11-044776
Feb. 23, 1999 (JP) ................................................ 11-044876

(51) Int. Cl.$^7$ ....................................................... F16D 3/06
(52) U.S. Cl. ............................. 464/162; 464/75; 464/181
(58) Field of Search ................................. 464/74, 75, 89, 464/162, 179, 182, 183, 181; 403/359.1, 359.5, 359.6; 74/492; 280/777

(56) References Cited

U.S. PATENT DOCUMENTS

| | | | |
|---|---|---|---|
| 2,821,277 | * 1/1958 | Hughes ........................... | 403/359.5 X |
| 3,615,960 | 10/1971 | Hoshii et al. . | |
| 5,243,874 | 9/1993 | Wolfe et al. . | |
| 5,640,884 | 6/1997 | Fujiu et al. . | |
| 5,655,968 | 8/1997 | Burton . | |
| 5,716,276 | * 2/1998 | Mangas et al. ................... | 464/162 X |
| 5,902,186 | 5/1999 | Gaukel . | |
| 5,984,354 | * 11/1999 | Kim ................................. | 74/492 X |

FOREIGN PATENT DOCUMENTS

| | | |
|---|---|---|
| 4435856 | 11/1995 | (DE) . |
| 0893613 A | 1/1999 | (EP) . |
| 53050 | * 9/1945 | (FR) ........................................ 464/74 |
| 1290685 | * 3/1962 | (FR) ........................................ 464/162 |
| 9941514 | 8/1999 | (WO) . |

* cited by examiner

Primary Examiner—Lynne H. Browne
Assistant Examiner—Greg Binda
(74) Attorney, Agent, or Firm—Silverman, Cass & Singer, Ltd.

(57) ABSTRACT

A driving shaft includes yokes at both its ends and an intermediate slidable portion composed of a male shaft member and a female shaft member fitted with each other by means of splines. The male shaft member includes a hollow shaft member having an inner diameter larger than the outer diameter of one end of the female shaft member on the side of the male shaft member, and a splined male member having a splined slidable portion to be fitted in the splined hole of the female shaft member and a fixing portion fitted in the hollow shaft member. An elastic body interposed between the inner surface of the hollow shaft member and the outer surface of the fixing portion to fix the splined male member to the hollow shaft member. In producing such a driving shaft, before fitting the splined male member in the hollow shaft member, a resin coating is applied to either the inner surface of the hollow shaft member or the fixing portion of the splined male member. As an alternative, in addition, the other not provided with the resin coating is provided in its opposite surface with a continuous groove or separated recesses and/or provided on the surface with a swelling accelerator for swelling the resin coating. After fitting, the resin coating is heated to cause the resin to flow into the groove or recesses and to solidify, or with the aid of the swelling accelerator the resin coating swells and enters the groove or recesses to achieve the fixation between the hollow shaft member and the splined male member.

8 Claims, 4 Drawing Sheets

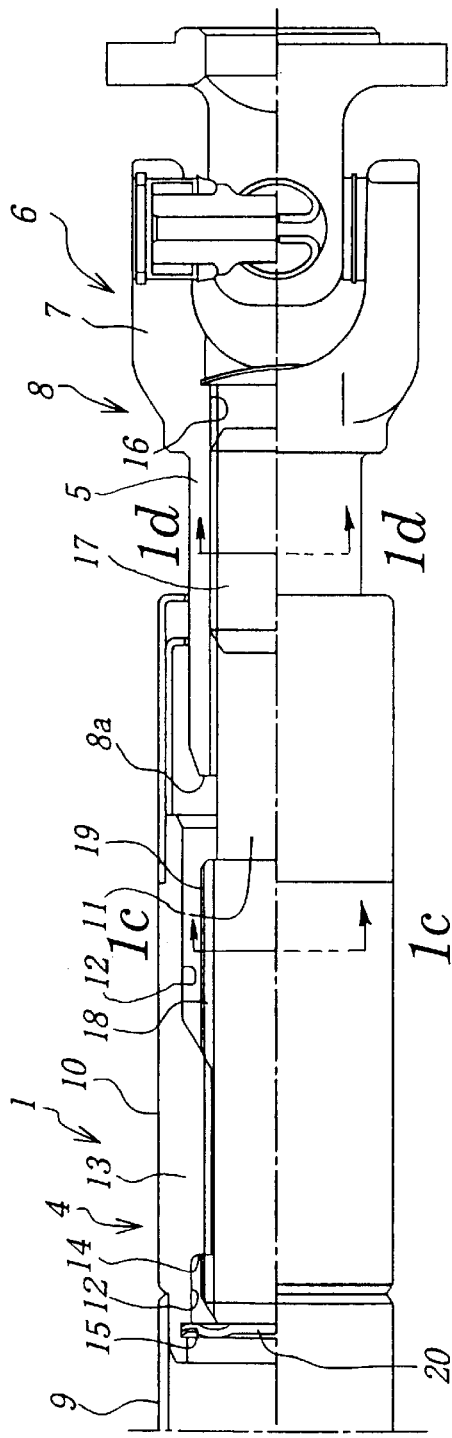
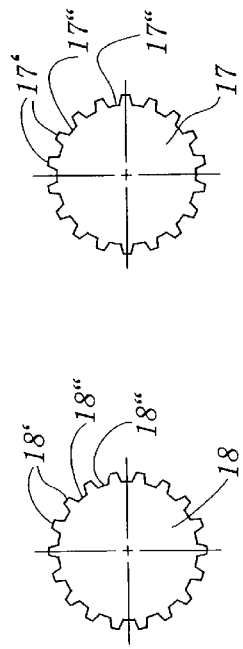
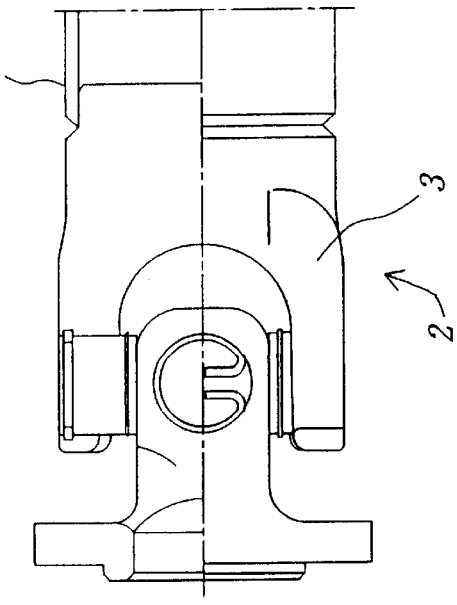

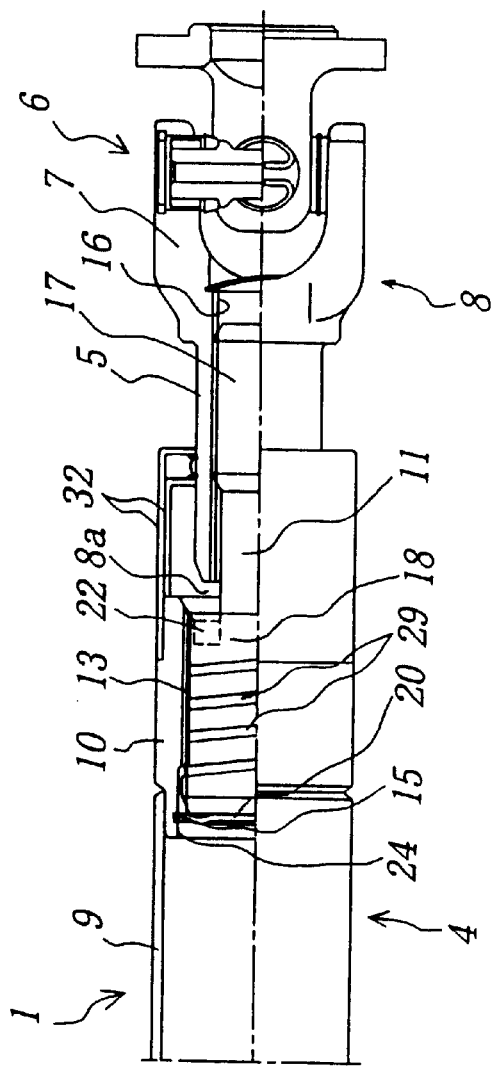
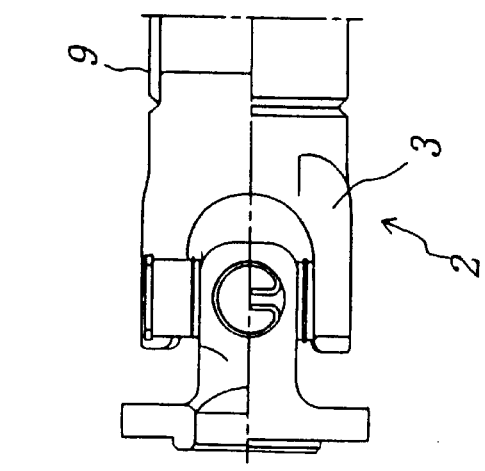
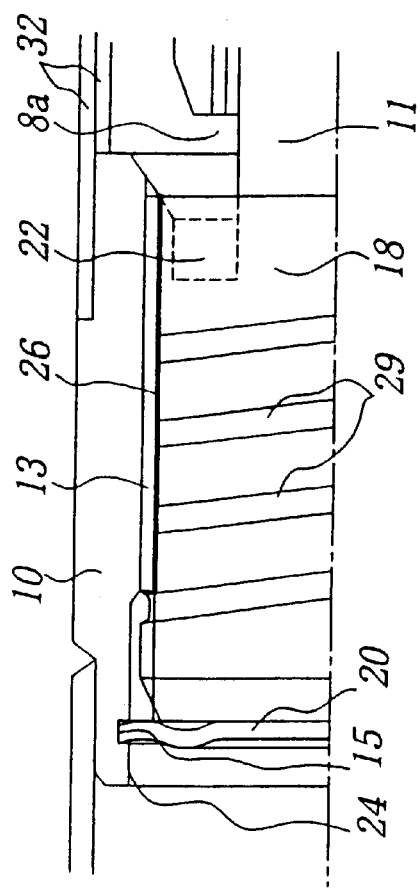

DRIVING SHAFT WITH MALE AND FEMALE SHAFT MEMBERS

BACKGROUND OF THE INVENTION

This invention relates to a driving shaft including at both the ends yokes constituting parts of respective universal joints and an intermediate slidable portion composed of a male shaft member and a female shaft member fitted with each other by means of splines, and more particularly to a method for producing the driving shaft.

With a driving shaft of this kind, it is often desirable that either the male shaft member or the female shaft member is axially contractible when being subjected to axial stresses causing the driving shaft to be contracted in excess of its predetermined elongation and contraction strokes. For this purpose, it has been proposed that a male or female shaft member is composed of at least two parts which are connected to each other by means of shear pins which may be broken when a predetermined load is applied thereto. It has also been proposed that either a male shaft member or a female shaft member of a driving shaft is connected to an axially contractible tube in order to make it possible for the driving shaft to contract axially when stresses in excess of a predetermined value are axially applied thereto. Moreover, it has been proposed to connect the two parts aforementioned by means of a snap ring, key, spline fitting in metal to metal contact, or adhesive.

With the shear pins described above, the connecting portions for the two parts are located only at two diametrically opposed positions, so that when the pins are progressively fatigued in use for a prolonged period of time, the load to be controlled by the pins would be changed. In other words, the limit of load determined by the pins would become lower than the initially aimed limit of load. With the use of deformable tube, moreover, it would be difficult to control the load at which the tube exhibits its effective performance. Namely, it would be difficult to determine the limit of load at which the tube starts to contract.

SUMMARY OF THE INVENTION

It is an object of the invention to provide a driving shaft which eliminates all the disadvantages of the prior art driving shaft and which is able to easily control the load causing the driving shaft to be contracted when being subjected to stresses in excess of a predetermined value.

In order to accomplish this object, the driving shaft according to the invention includes a male shaft member comprising a) a hollow shaft member having one end connected to said yoke of the universal joint and having an inner surface whose inner diameter is larger than the outer diameter of one end of said female shaft member on the side of said male shaft member, and b) a splined male member having a splined slidable portion slidably fitted in a splined hole of said female shaft member and a fixing portion to be fitted in said inner surface of said hollow shaft member and further having an elastic body interposed between the inner surface of said hollow shaft member and the outer surface of said fixing portion to fix said splined male member to said hollow shaft member.

With this construction according to the invention, when a contraction in excess of a predetermined value occurs in the splined slidable portion, the female shaft member moves over the splined slidable portion of the splined male member so as to be in contact with the fixing portion of the splined male member with their end faces to urge the splined male member in its axial direction. If such an axial load exceeds the holding force derived from the frictional engagement between the hollow shaft member and the splined male member with the aid of the elastic body between the hollow shaft member and the fixing portion of the splined male member, the splined male member slidably moves in its axial direction relative to the hollow shaft member, whereby the male shaft member entirely contracts or the driving shaft is greatly contracted as a whole.

According to the invention, the axial load acting upon the driving shaft can be controlled by the frictional engagement between the hollow shaft member and the splined male member with the aid of the elastic body therebetween.

In a preferred embodiment, on being subjected to axial displacement and axial load in excess of those in the ranges in normal use, the female shaft member is brought into contact with the fixing portion of the splined male member with their end faces to cause the splined male member to disconnect from the hollow shaft member. In general, for example, with driving shafts for use in automobiles, vehicles for agricultural machineries, industrial vehicles, vehicles for construction equipment and the like, the axial displacement of the driving shaft in use may be 0 to 200 mm, while the axial load may be 0 to 1,000 kg.

In another preferred embodiment, the hollow shaft member is provided in the inner surface with a spline-shaped fixing portion, the fixing portion of the splined male member is formed as a splined fixing portion to be fitted in the spline-shaped fixing portion of the hollow shaft member, and the elastic body being interposed between the spline-shaped fixing portion and the splined fixing portion. If the splined slidable portion and the splined fixing portion are equal in size, it is preferable to form the spline grooves of these portions to be circumferentially shifted from each other with phase difference of one half of the pitch of the spline grooves.

In a further preferred embodiment, the fixing portion of the splined male member is formed as a radially enlarged portion having a diameter larger than the outer diameter of the end of the female shaft member adjacent the splined male member, and the end face of the radially enlarged portion is formed with an annular groove into which the forward end of the female shaft member enters.

In another aspect of the invention, in a method for producing a driving shaft of the kind mentioned in the first paragraph and said male shaft member including a) a hollow shaft member having one end connected to said yoke of the universal joint and having an inner diameter larger than the outer diameter of one end of said female shaft member on the side of said male shaft member, and b) a splined male member having a splined slidable portion slidably fitted in a splined hole of said female shaft member and a fixing portion to be fitted in the inner surface of said hollow shaft member, the method according to the invention comprises the steps of:

applying a resin coating to either said inner surface of said hollow shaft member or said fixing portion of said splined male member, inserting and fitting said fixing portion of said splined male member in the inside of said hollow shaft member, and fixing said hollow shaft member and the splined male member to each other by means of swelling of the resin and/or restoring force due to elasticity of the resin of said resin coating.

According to the method of the invention, the axial load can be controlled by the thickness of the resin coating applied to either the inner surface of the hollow shaft member or the fixing portion of the splined male member and the coated area of the swelling accelerator for swelling the resin coating, for example, the total opening area of the continuous groove or recesses spaced apart from each other provided in the surface of the mating member with which the resin coating is brought into contact.

With this construction, when a large axial load is applied to the driving shaft, the female shaft member moves to be in contact with the fixing portion of the splined male member with their end faces to urge the splined male member in the manner as described above. If such an axial load exceeds the holding force derived from the frictional engagement between the inner surface of the hollow shaft member and the fixing portion of the splined male member with the aid of the resin coating, the splined male member slidably moves in its axial direction relative to the hollow shaft member, whereby the male shaft member entirely contracts or the driving shaft is greatly contracted as a whole.

In a preferred embodiment, the inner surface of the hollow shaft member is formed with a spline-shaped fixing portion, and the fixing portion of the splined male member is formed as a splined fixing portion to be fitted with the spline-shaped fixing portion. With this construction, the relative rotation between the hollow shaft member and the splined male member is prevented in a reliable manner.

In another preferred embodiment, a resin coating is applied to either the inner surface of the hollow shaft member or the fixing portion of the splined male member, and a continuous groove or recesses spaced apart from each other are formed in the opposite circumferential surface of the other not provided with the resin coating and a swelling accelerator for swelling the resin of the resin coating is coated on the groove or recesses. With this construction, the holding force derived from the frictional engagement can be more easily controlled by varying the amounts of the resin coating and the swelling accelerator.

The method according to a further aspect of the invention comprises the steps of:

applying a resin coating to either said inner surface of said hollow shaft member or said fixing portion of said splined male member, and forming a continuous groove or recesses separated from each other in the other not provided with said resin coating, inserting and fitting said splined male member in said inner surface of said hollow shaft member and thereafter heating said fixing portion to melt said resin coating so as to cause part of the melted resin to flow into said continuous groove or separated recesses and to solidify therein, thereby fixing said splined male member to said hollow shaft member with the aid of the solidified resin, and slidably fitting said splined slidable portion of said splined male member fixed to said hollow shaft member into said splined hole of said female shaft member by means of splines.

With this construction, when a large axial load is applied to the driving shaft, the female shaft member moves to be in contact with the fixing portion of the splined male member with their end faces to urge the splined male member in the manner as described above. If such an axial load exceeds the restoring force of the resin coating caused by its elasticity between the inner surface of the hollow shaft member and the fixing portion of the splined male member and the shearing force and holding force derived from the frictional engagement by the resin projecting in the continuous groove or separated recesses, the splined male member slidably moves in its axial direction relative to the hollow shaft member, whereby the male shaft member entirely contracts or the driving shaft is greatly contracted as a whole.

According to the method of the invention, the axial load can be controlled by the thickness of the resin coating applied to either the inner surface of the hollow shaft member or the fixing portion of the splined male member and the total area of the continuous groove or recesses spaced apart from each other into which the coated resin flows upon being heated. The resin may be heated by the high-frequency induction heating or by the use of welding heat generated in welding components.

The invention will be more fully understood by referring to the following detailed specification and claims taken in connection with the connection with the appended drawings.

BRIEF DESCRIPTION OF THE DRAWINGS

FIG. 1a is a partly sectional side view of the main part of the driving shaft according to the invention;

FIG. 1b is a partly sectional side view of the universal joint to be connected to the male shaft member of the driving shaft in FIG. 1a.

FIG. 1c is a sectional view taken along the line 1c—1c of FIG. 1a in the direction indicated generally;

FIG. 1d is a sectional view taken along the line 1d—1d of FIG. 1a in the direction indicated generally.

FIG. 4a is a partly sectional side view of the main part of the driving shaft of a further embodiment of the invention;

FIG. 4b is a partly sectional side view of the universal joint to be connected to the male shaft member of the driving shaft in FIG. 4a;

FIG. 4c is an enlarged sectional view of the part of the driving shaft shown in FIG. 4a;

FIG. 5c is an enlarged longitudinal sectional view illustrating the resin flowed in the groove shown in FIG. 5a.

DESCRIPTION OF THE PREFERRED EMBODIMENTS

Figure 2:
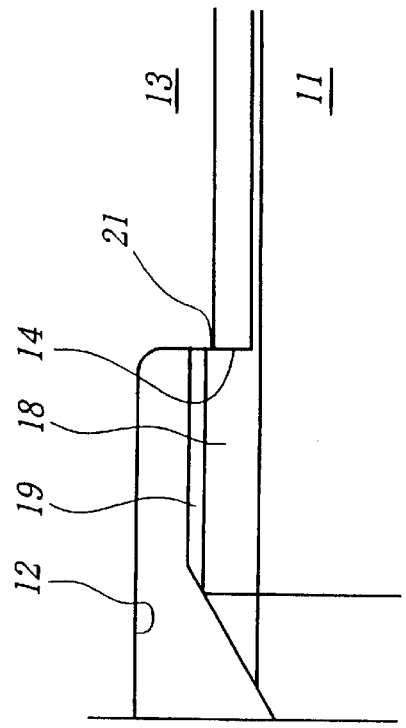
FIG. 2 is an enlarged partly sectional view illustrating the fixed condition of the fitting the hollow shaft member and the splined male member according to the invention.

Referring to FIGS. 1a and 1b, the driving shaft 1 according to the invention comprises a male shaft member 4 connected to the yoke 3 (refer to FIG. 1b) of one universal joint 2, and a female shaft member 8 having a shaft portion 5 fitted with the male shaft member 4 by means of splines and connected to the yoke 7 of the other universal joint 6.

In the preferred embodiment of the invention, the male shaft member 4 comprises a hollow tube 9 having one end connected to the yoke 3 of the universal joint 2, a hollow shaft member 10 connected to the other end of the hollow tube 9, and a splined male member 11 fitted in the hollow shaft member 10. However, the hollow shaft member 10 may be directly connected to the yoke 3 without using the hollow tube 9.

In the preferred embodiment of the invention shown in FIGS. 1a and 1b, the hollow shaft member 10 has an inner surface 12 whose diameter is larger than the outer diameter of the shaft portion 5 of the female shaft member 8. As shown in the drawing, moreover, the spline-shaped fixing portion 13 of the hollow shaft member 10 is formed with a shoulder 14 at its end remote from the female shaft member 8 to be perpendicular to the inner 20 surface 12 of the hollow shaft member 10, if required. At a position spaced from the shoulder 14 on the side of the hollow tube 9, the inner surface 12 is preferably formed with an annular groove 15 for which purpose will be explained below.

The splined male member 11 is provided with a splined slidable portion 17 preferably covered with a resin coating, which is slidably fitted in the splined bore 16 of the female shaft member 8. The splined male member 11 is further provided on the opposite side of the splined slidable portion 17 with a fixing portion which is adapted to be fixed to the inner surface of the hollow shaft member 10. An elastic body 19 is interposed between the inner surface of the hollow shaft member 10 and the fixing portion 18 of the splined male member 11. As shown in the drawing, preferably, the hollow shaft member 10 is provided on its inner surface with a spline-shaped fixing portion 13, and the fixing portion 18 of the splined male member 11 is formed as a splined fixing portion on which an elastic body 19 is provided.

Providing the elastic body 19 on the splined fixing portion 18 enlarges its outer contour to be slightly larger than the spline-shaped fixing portion 13 of the hollow shaft member 10, so that the splined fixing portion 18 can be press-fitted in the spline-shaped fixing portion 13 with an interference, thereby frictionally fixing the splined male member 11 to the hollow shaft member 10.

In order to prevent the splined male member 11 from unintentionally slidably moving in its axial direction away from the female shaft member 8 with respect to the hollow shaft member 10, a stopper plate 20 is arranged in the annular groove 15 formed in the hollow shaft member 10 so that the periphery of the stopper plate 20 is fitted in the annular groove 15 to impede the movement of the splined male member 11 into the hollow tube 9. It is preferable that the splined male member 11 is formed with a radially extending shoulder 21 adjacent the splined fixing portion 18 on the opposite side of the female shaft member 8, the shoulder 21 being adapted to engage the shoulder 14 of the hollow shaft member 10.

In the event that the shoulder 21 is provided, the splined slidable portion 17 of the splined male member 11 is inserted into the hollow shaft member 10 through its opening on the side of the annular groove 15 and the splined fixing portion 18 is then press-fitted into the spline-shaped fixing portion 13 until the shoulder 21 abuts against the shoulder 14 of the hollow shaft member 10. Thereafter, the stopper plate 20 is arranged with its periphery fitted in the annular groove 15 of the spline-shaped fixing portion 13 to complete the fixing of the splined male member 11 to the hollow shaft member 10.

In the event that no shoulder 21 is provided, after the stopper plate 20 has been arranged in the annular groove 15 with its periphery fitted therein, the splined male member 11 is press-fitted into the hollow-shaft member 10 through its opening facing to the female shaft member 8 until the end of the splined fixing portion 18 abuts against the stopper plate 20, whereby the splined male member 11 is fixed to the hollow shaft member 10 by means of the frictional and interference fit between the elastic body 19 on the splined fixing portion 18 and the spline-shaped fixing portion 13 of the hollow shaft member 10.

It is preferable that the spline grooves 17" of the splined slidable portion 17 of the splined male member 11 adapted to be slidably fitted in the splined bore 16 of the female shaft member 8 are circumferentially shifted relative to the spline grooves 18" of the splined fixing portion 18 of the splined male member 11 adapted to be press-fitted in the spline-shaped fixing portion 13 of the hollow shaft member 10 with a phase difference of one half of the pitch of the spline grooves.

If the connection between the male splined member 11 and the female shaft member 8 is contracted beyond a predetermined value, the female shaft member 8 moves over the splined slidable portion 17 having splines 17' of the male splined portion 11 so as to permit the end face 8a of the female shaft member 8 to abut against the end face of the splined fixing portion 18 having splines 18' of the splined male member 11 with great certainty, by virtue of the phase difference between the spline grooves 17" on both the ends of the splined male member 11. (see FIGS, 1a, 1c c and 1d). As a result, the splined male member 11 is urged in its axial direction.

When such an axial load acting upon the male splined member 11 (see FIGS. 1a, 1c and 1d). in the axial direction exceeds the holding force caused by the frictional engagement between the elastic body 19 on the splined fixing portion 18 and the spline-shaped fixing portion 13 of the hollow shaft member 10, the splined male member 11 is moved in the axial direction relative to the hollow shaft member 10 into the inside of the hollow tube 9. In the case of the stopper plate 20 provided in the annular groove 15, moreover, the stopper plate 20 will be deformed, broken or dislodged from the annular groove 15 to allow the splined fixing portion 18 to slide relative to the hollow shaft member 10, so that the male shaft member 4 is entirely contracted, that is, the driving shaft 1 is greatly contracted as a whole.

Figure 3:
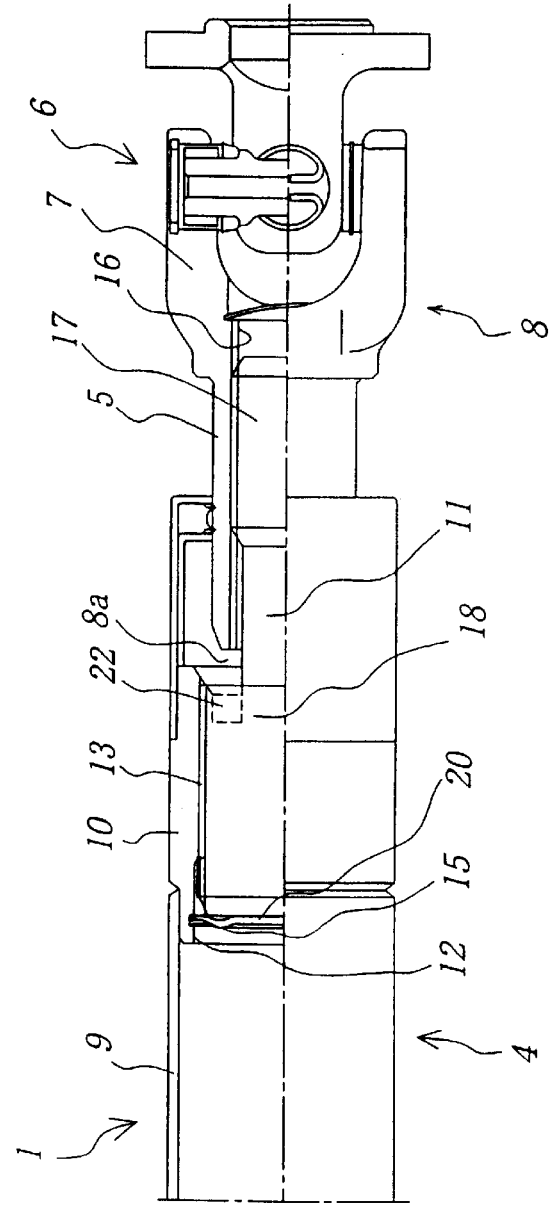
FIG. 3 is a partly sectional side view of the driving shaft of another embodiment of the invention whose fixing portion of the splined male member or the splined fixing portion is formed as a radially enlarged portion of the female shaft member.

FIG. 3 illustrates the driving shaft of another preferred embodiment according to the invention. The driving shaft of this embodiment is substantially similar to that of the previous embodiment with the exception that the fixing portion or the splined fixing portion 18 of the splined male member 11 is formed as a radially enlarged portion having a diameter larger than the outer diameter of the shaft portion 5 of the female shaft member 8, and the enlarged portion is formed in the end surface with an annular groove 22 into which the forward end 8a of the female shaft member 8 can be inserted.

With the construction of the embodiments described above according to the invention, a load causing the driving shaft to contract in excess of its normal stroke can be controlled by the frictional engagement force of the elastic body interposed between the inner surface of the hollow shaft member and the fixing portion of the splined male member and, if required, by the deforming or breaking strength of the stopper plate or frictional engagement force of the stopper plate with the annular groove.

In addition, the frictional engagement and interference fit between the inner surface of the hollow shaft member and the fixing portion of the splined male member through the elastic body can maintain the controlled force for stably contracting the connection between the hollow shaft member and the splined male member due to the relative movement therebetween without causing the unfavorable effect of rust which would occur in metal to metal contact.

The method for producing the driving shaft according to the invention will be explained with reference to FIGS. 4a to 4c and FIGS. 5a to 5d hereinafter.

The driving shaft shown in FIGS. 4a and 4b is substantially similar to those shown in FIGS. 1a and 1b and particularly FIG. 3 with exception of some features which will be additionally explained. In FIGS. 4a to 4c and FIGS. 5a to 5d, corresponding components are identified by reference numerals corresponding to those used in FIGS. 1a and 1b and FIGS. 2 and 3.

In this embodiment, the hollow shaft member 10 is provided with dust seals 32 slidably contacting the outer surface of the female shaft member 8. The splined male member 11 is provided with a spline slidable portion covered with a resin coating 26, which is slidably fitted in the splined bore 16 of the female shaft member 8. The splined male member 11 is further provided on the opposite side of the splined slidable portion 17 with a splined fixing portion 18 adapted to be fitted in the spline-shaped fixing portion 13 of the hollow shaft member 10.

According to the illustrated embodiment, a resin coating 26 is applied to one of the inner surface 24 of the hollow shaft member 10, preferably the spline-shaped fixing portion 13 formed on the inner surface 24 and the fixing portion of the splined male member 11, preferably the splined fixing portion 18, and a swelling accelerator or swelling accelerating agent for swelling the resin coating 26 is applied by coating to the other of the above two portions not provided with the resin coating.

The surface to be coated with the swelling accelerator is formed with a continuous groove or recesses 29 spaced apart from each other, a continuous spiral groove 29 in the illustrated embodiment, onto which the swelling accelerator is coated entirely or partially. Instead of such a spiral continuous groove 29, a plurality of annular grooves or recesses separated from each other may be formed. After the fixing portion of the splined male member has been inserted into the hollow shaft member, the resin coating contacting the swelling accelerator will swell to fix the fixing portion of the splined male member and the hollow shaft member to each other by the frictional engagement therebetween in conjunction with the restoring force of the resin coating caused by its elasticity. By coating the continuous groove or recesses separated from each other with the swelling accelerator, the resin of the resin coating in opposition to the groove or recesses will swell or project or protrude into the continuous groove or recesses separated from each other to ensure the holding the two members with great certainty.

Figure 5A:
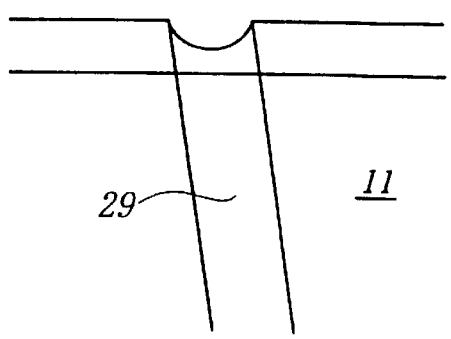
FIG. 5a is an enlarged longitudinal sectional view illustrating the groove in the male shaft member formed by cutting.
Figure 5B:
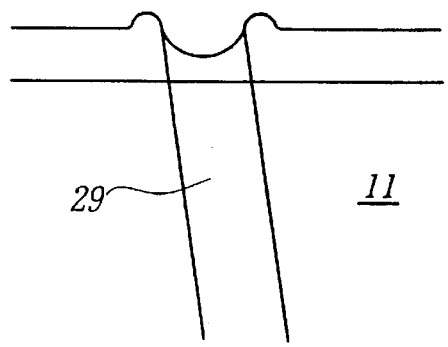
FIG. 5b is an enlarged longitudinal sectional view illustrating the groove formed by rolling.

In the shown preferred embodiment, as shown in enlarged scale in FIGS. 5a to 5d, the continuous groove or separate recesses 29 may be formed by cutting (FIG. 5a), or rolling (FIG. 5b). In rolling, small protrusions may be preferably formed along edges of the groove on the larger diameter surfaces of the splines as shown in FIG. 5b. The cross-section of the groove may be any shape such as semicircular, rectangular, or V-shaped or tapered.

Figure 5C:
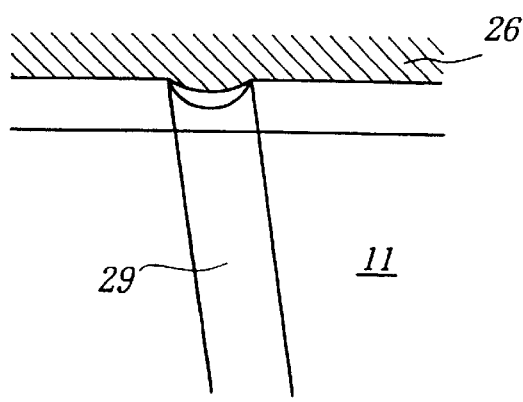
Figure 5D:
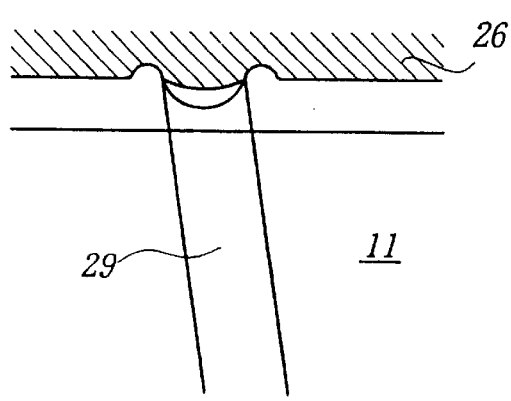
FIG. 5d is an enlarged longitudinal sectional view illustrating the resin flowed in the groove shown in FIG. 5b.

By previously coating the continuous groove or recesses 29 separated from each other with the swelling accelerator, after fitting the hollow shaft member 10 on the fixing portion of the splined male member 11, the resin coating 26 contacting the swelling accelerator swells and partly projects into the continuous groove or recesses separated from each other as shown in FIGS. 5c or 5d to connect the hollow shaft member 10 and the splined male member 11 with a given holding force with more certainty.

In order to prevent the fixation between the hollow shaft member and the splined male member from being unintentionally disconnected in usual use, it is preferable that the stopper plate 20 is arranged in the annular groove 15 formed in the hollow shaft member 10 with its periphery fitted in the annular groove 5 for the purpose of preventing the splined male member 11 from entering the hollow tube 9.

In general, with driving shafts for use in automobiles, vehicles for agricultural machineries, industrial vehicles, vehicles for construction equipment and the like, the axial displacement of the driving shaft in use may be 0 to 200 mm, while the axial load may be 0 to 1,000 kg. When the driving shaft is subjected to the axial displacement and load in excess of predetermined values to cause the splined slidable portion 17 to move so as to contract the driving shaft, the female shaft member 8 abuts against the fixing portion of the splined male member 11 with their end faces so that the frictional engagement between the inner surface of the hollow shaft member 10 and the fixing portion of the splined male member 11 with the aid of the resin coating is disengaged to permit the splined male member 11 to slide into its axial direction relative to the hollow shaft member 10.

In order to securely bring the female shaft member 8 into abutment against the end surface of the fixing portion of the splined male member 11, it is preferable that the fixing portion of the splined male member or the splined fixing portion 18 is radially enlarged to have a diameter larger than the outer diameter of the shaft portion 5 of the female shaft member 8, and the end of the splined fixing portion 18 is formed with an annular guide groove 22 for receiving the forward end of the female shaft member 8.

With the construction of the embodiment described herein according to the invention, a load causing the driving shaft to contract in excess of its normal stroke can be controlled by the coating amounts (area and/or thickness) of the resin coating and the swelling accelerator to be coated on one and the other of the inner surface of the hollow shaft member or the splined fixing portion provided on the inner surface thereof and the fixing portion of the splined male member or splined fixing portion. The coating amounts of the resin coating and the swelling accelerator determine the holding force caused by the frictional engagement between the hollow shaft member and the splined male member. Moreover, the load can be controlled by the deforming or breaking strength or frictional engagement force of the stopper plate engaging with the annular groove.

In an alternative embodiment of the invention, the inner surface 24 of the hollow shaft member 10 or the spline-shaped fixing portion 13 is coated with a resin coating 26 and the fixing portion of the splined male member 11 or the splined fixing portion 18 is formed with a spiral groove 29 without using a swelling accelerator. The groove 29 may be formed by cutting or rolling in the same manner in the previous embodiment.

In this embodiment, after the hollow shaft member 10 and the splined male member 11, one being coated with the resin coating 26 and the other being formed with the continuous groove or recesses 29 separated from each other are fitted with each other, the fixing portion of the splined male portion 11 or the splined fixing portion 18 is circumferentially heated by the high-frequency induction heating or by utilizing the welding heat generated in welding components. By the heating, the resin coating will be melted so that the resin in opposition to the continuous groove or the separate recesses 29 flows into groove or recesses 29. After solidification, the solidified resin in the continuous groove or separate recesses 29 provides the holding force to assist in the frictional engagement between the hollow shaft member 10 and the splined male member 11 to ensure the fixation therebetween.

When the driving shaft is subjected to the axial displacement and load in excess of the holding force of the resin projected in the continuous groove or separated recesses 29 in the fixing portion or splined fixing portion 18 and the frictional engagement between the hollow shaft member 10 and the splined fixing portion 18, the splined male member 11 moves in its axial direction relative to the hollow shaft member 10 into the hollow tube 9. In the case of providing the stopper 20, the splined male member 11 slides relative to the hollow shaft member 10 in sequence with the deformation or breakage of the stopper plate 20 or the dislodgment of the stopper plate 20 from the annular groove 15, so that the male shaft member 4 is contracted as a whole and consequently the entire driving shaft 1 is greatly contracted.

With the construction of the final embodiment according to the invention, a load causing the driving shaft to contract in excess of its normal stroke can be controlled by the holding force derived from the frictional engagement and the shearing force between the continuous groove or separated recesses and the solidified resin of the resin coating coated on the spline-shaped fixing portion of the hollow shaft member or the splined fixing portion of the splined male member and projected into the continuous groove or separated recesses provided in the splined fixing portion of the splined male member or spline-shaped fixing portion of the hollow shaft member. In other words, the load can be finely controlled by the total amount of the resin projecting into the continuous groove or the separated recesses and hence opening areas of the groove or recesses. Moreover, if the stopper plate is provided, the load can be controlled by the deforming or breaking strength or frictional engagement force of the stopper plate fitted in the annular groove.

According to the invention, moreover, the resin can be readily melted and flowed into the groove or separated recesses by the use of high-frequency induction heating or welding heat generated in welding components to achieve the fixation between the hollow shaft member and the splined male member in a simple and reliable manner.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A driving shaft including at both ends yokes as parts of respective universal joints and including an intermediate slidable portion composed of a male shaft member and a female shaft member fitted with each other by means of splines, wherein said male shaft member comprises:

a) a hollow shaft member having one end connected to one of said yokes of one of said universal joints and having an inner surface whose inner diameter is larger than the outer diameter of one end of said female shaft member on the side of said male shaft member, and b) a splined male member having a splined slidable portion slidably fitted in a splined hole of said female shaft member and a fixing portion to be fitted in said inner surface of said hollow shaft member and further having an elastic body interposed between the inner surface of said hollow shaft member and the outer surface of said fixing portion to fix said splined male member to said hollow shaft member.

2. The driving shaft as set forth in claim 1, wherein said hollow shaft member is provided in the inner surface with a spline-shaped fixing portion, said fixing portion of said splined male member is formed as a splined fixing portion to be fitted in said spline-shaped fixing portion of said hollow shaft member, and said elastic body being interposed between said spline-shaped fixing portion and said splined fixing portion.

3. A driving shaft including at both ends yokes as parts of respective universal Joints and including an intermediate slidable portion composed of a male shaft member and a female shaft member fitted with each other by means of splines, wherein said male shaft member comprises:

a) a hollow shaft member having one end connected to one of said yokes of one of said universal Joints and having an inner surface whose inner diameter is larger than the outer diameter of one end of said female shaft member on the side of said male shaft member, and b) a splined male member having a splined slidable portion slidably fitted in a splined hole of said female shaft member and a fixing portion to be fitted in said inner surface of said hollow shaft member and further having an elastic body interposed between the inner surface of said hollow shaft member and the outer surface of said fixing portion to fix said splined male member to said hollow shaft member, said hollow shaft member being provided in the inner surface with a spline-shaped fixing portion, said fixing portion of said splined male member being formed as a splined fixing portion to be fitted in said spline-shaped fixing portion of said hollow shaft member, and said elastic body being interposed between said spline-shaped fixing portion and said splined fixing portion.

4. The driving shaft as set forth in claim 3, wherein on being subjected to axial displacement and axial load in excess of those in the ranges in normal use, said female shaft member is brought into contact with said fixing portion of said splined male member with their end faces to cause said splined male member to disconnect from said hollow shaft member.

5. The driving shaft as set forth in claim 4, wherein the spline grooves of said splined slidable portion of said splined male member and said splined fixing portion are circumferentially shifted from each other with a phase difference of one half of the pitch of the spline grooves.

6. The driving shaft as set forth in claim 3, wherein said spline-shaped fixing portion is formed at its end remote from said female shaft member with a shoulder perpendicular to the inner surface of said hollow shaft member, and said splined male member is formed with a radially extending shoulder adjacent the splined fixing portion on the opposite side of the female shaft member so as to permit said radially extending shoulder to abut against said shoulder of said spline-shaped fixing portion.

7. The driving shaft as set forth in claim 3, wherein said fixing portion of said splined male member is formed as a radially enlarged portion having a diameter larger than the outer diameter of the end of said female shaft member adjacent said splined male member, and the end face of said radially enlarged portion is formed with an annular groove into which the forward end of said female shaft member enters.

8. The driving shaft as set forth in claim 3, wherein said hollow shaft member is formed in its inner surface with an annular groove at a position near to its end on the opposite side of said female shaft member, and a stopper plate is provided in said annular groove with its periphery fitted therein.

* * * * *